United States Patent
Zaitsev et al.

(10) Patent No.: US 10,140,548 B2
(45) Date of Patent: Nov. 27, 2018

(54) STATISTICAL NOISE ANALYSIS FOR MOTION DETECTION

(71) Applicant: Lenovo (Singapore) Pte. Ltd., Singapore (SG)

(72) Inventors: Grigori Zaitsev, Durham, NC (US); Rod D. Waltermann, Rougemont, NC (US); Joaquin F. Luna, Raleigh, NC (US); Brian A. Burdette, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 790 days.

(21) Appl. No.: 14/461,216

(22) Filed: Aug. 15, 2014

(65) Prior Publication Data

US 2016/0048974 A1    Feb. 18, 2016

(51) Int. Cl.
*G06K 9/00*  (2006.01)
*G06K 9/62*  (2006.01)
*G06T 7/254*  (2017.01)
*G06T 7/277*  (2017.01)

(52) U.S. Cl.
CPC ....... *G06K 9/6202* (2013.01); *G06K 9/00771* (2013.01); *G06T 7/254* (2017.01); *G06T 7/277* (2017.01); *G06T 2207/30232* (2013.01)

(58) Field of Classification Search
None
See application file for complete search history.

(56) References Cited

U.S. PATENT DOCUMENTS

| | | | | |
|---|---|---|---|---|
| 2010/0027898 | A1* | 2/2010 | Lee | G06T 7/2053 382/236 |
| 2011/0150271 | A1* | 6/2011 | Lee | G06K 9/00335 382/103 |
| 2012/0275655 | A1* | 11/2012 | Uchida | H04N 5/213 382/107 |
| 2014/0341474 | A1* | 11/2014 | Dollar | G06K 9/00711 382/197 |

OTHER PUBLICATIONS

Chakraborty et al., "Real-time Image-Based Motion Detection Using Color and Structure," University of Texas at El Paso, Proceedings of the 6th International Conference on Image Analysis and Recognition, ICIAR 2009, Halifax, Canada, Jul. 2009, pp. 678-686.
Ren et al., "Foreground Detection with Non-stationary Background," IAPR Workshop on Machine Vision Application, Nov. 2000, The University of Tokyo, Japan, pp. 557-561.

* cited by examiner

*Primary Examiner* — Weiwen Yang
(74) *Attorney, Agent, or Firm* — VanLeeuwen & VanLeeuwen; Carlos Munoz-Bustamante (57) ABSTRACT

An approach is provided to detecting motion using statistical noise analysis. In the approach, reference statistics are calculated that relate to one or more noise characteristics that correspond to pixels in a first set of video images of an area being monitored. Current noise characteristics are received that correspond to the same pixels in a second set of video images of the area being monitored, with the first set of video images being captured before the second set of video images. Motion is detected in the area being monitored by comparing the reference statistics to the current noise characteristics.

20 Claims, 8 Drawing Sheets

STATISTICAL NOISE ANALYSIS FOR MOTION DETECTION

BACKGROUND

Motion detectors have found wide use in domestic and commercial applications. Motion sensors are used in a variety of settings. A motion detector may be among the sensors of a burglar alarm that is used to alert the home owner or security service when it detects the motion of a possible intruder. Traditional motion detectors utilize a technique called "background subtraction" to detect intruders. In background subtraction, an image's foreground is extracted for further processing (object recognition etc.). Generally an image's regions of interest are objects (humans, cars, etc.) in its foreground, such as a possible intruder. After image preprocessing, object localization is performed. While background subtraction is a widely used approach for detecting moving objects in videos obtained from static cameras, such as a security camera, the approach has limitations. The rationale in background subtraction is detecting the moving objects based on the difference between the current frame and a reference frame, often called "background image", or "background model". Background subtraction is generally performed when the image in question is a part of a video stream. Detecting motion using background subtraction is challenged by false alarms and detection failure, especially in environments with changing illumination and when an object, such as an intruder, blends into the background, such as when an intruder is wearing camouflage that closely matches the background.

SUMMARY

An approach is provided to detecting motion using statistical noise analysis. In the approach, reference statistics are calculated that relate to one or more noise characteristics that correspond to pixels in a first set of video images of an area being monitored. Current noise characteristics are received that correspond to the same pixels in a second set of video images of the area being monitored, with the first set of video images being captured before the second set of video images. Motion is detected in the area being monitored by comparing the reference statistics to the current noise characteristics.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
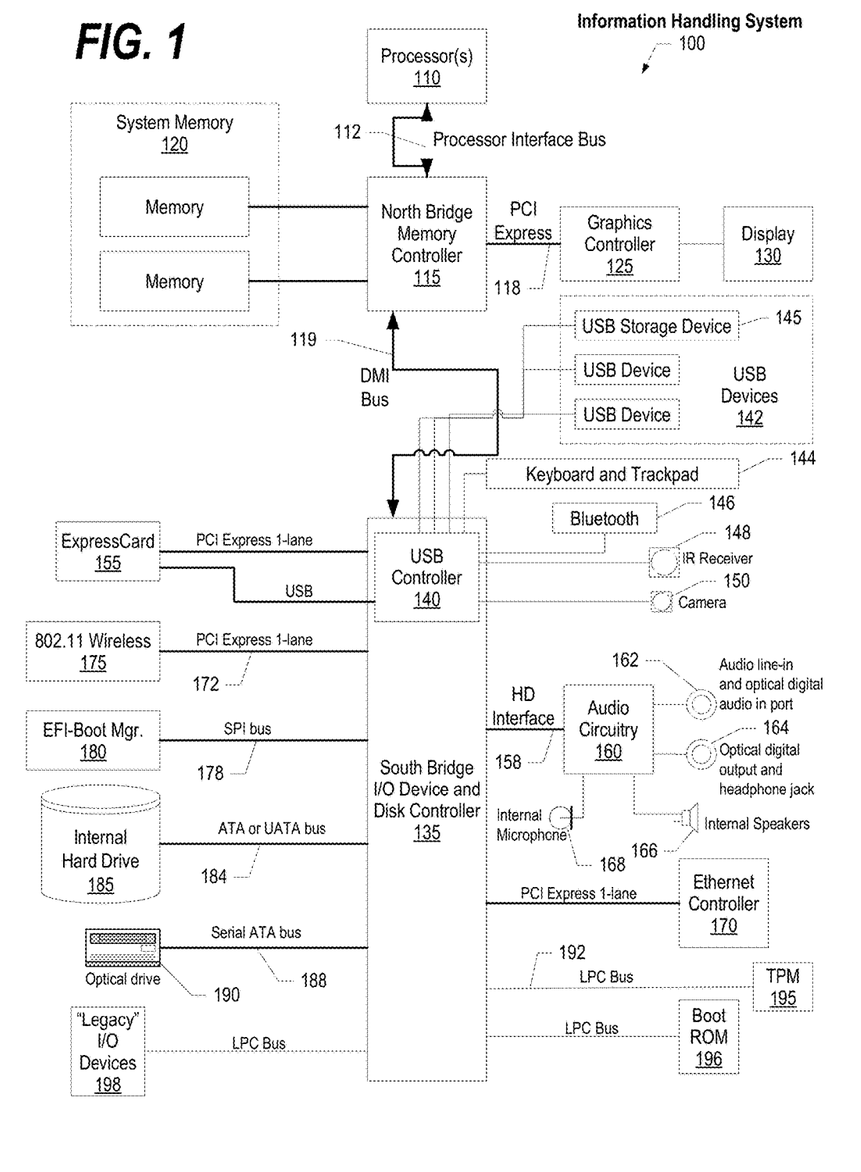
FIG. 1 is a block diagram of a data processing system in which the methods described herein can be implemented.
Figure 2:
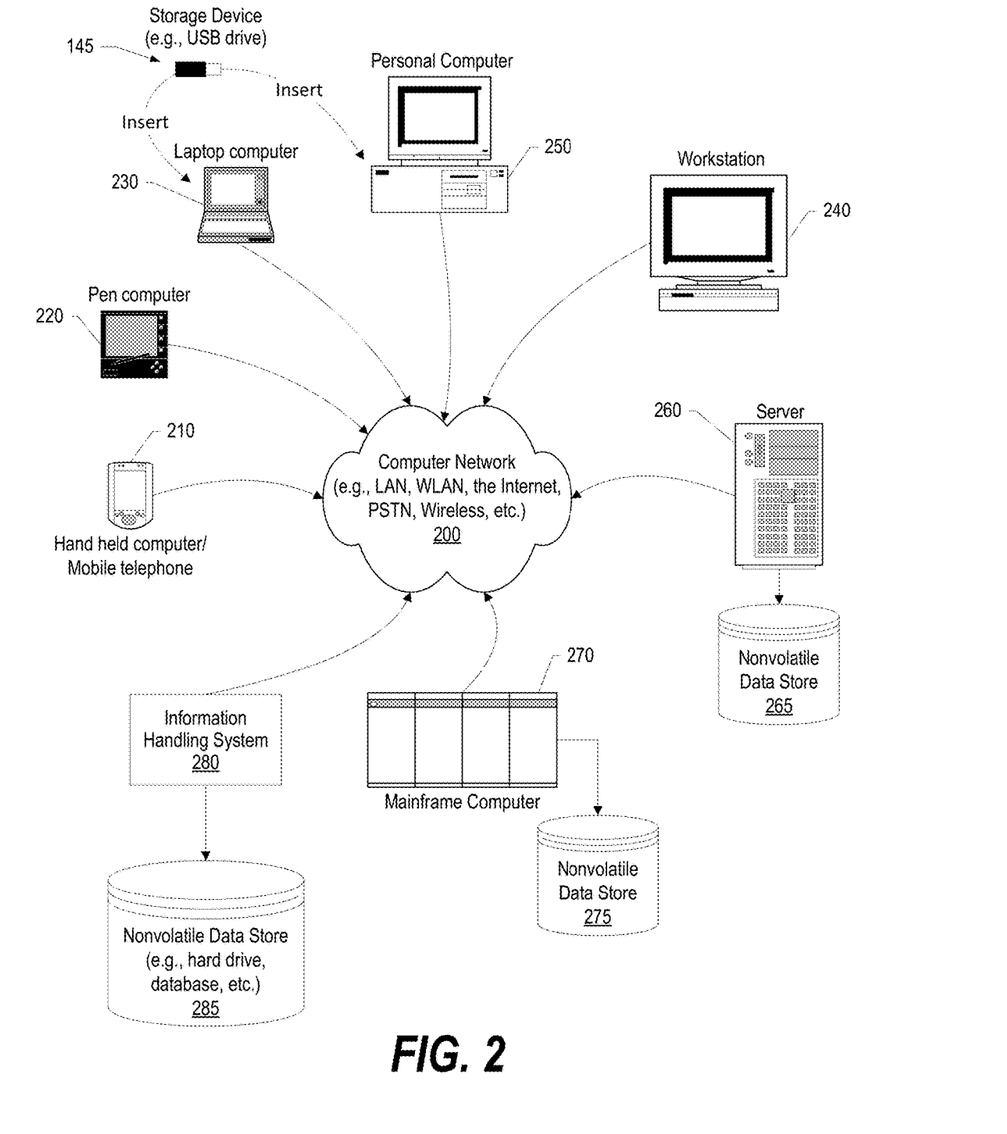
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
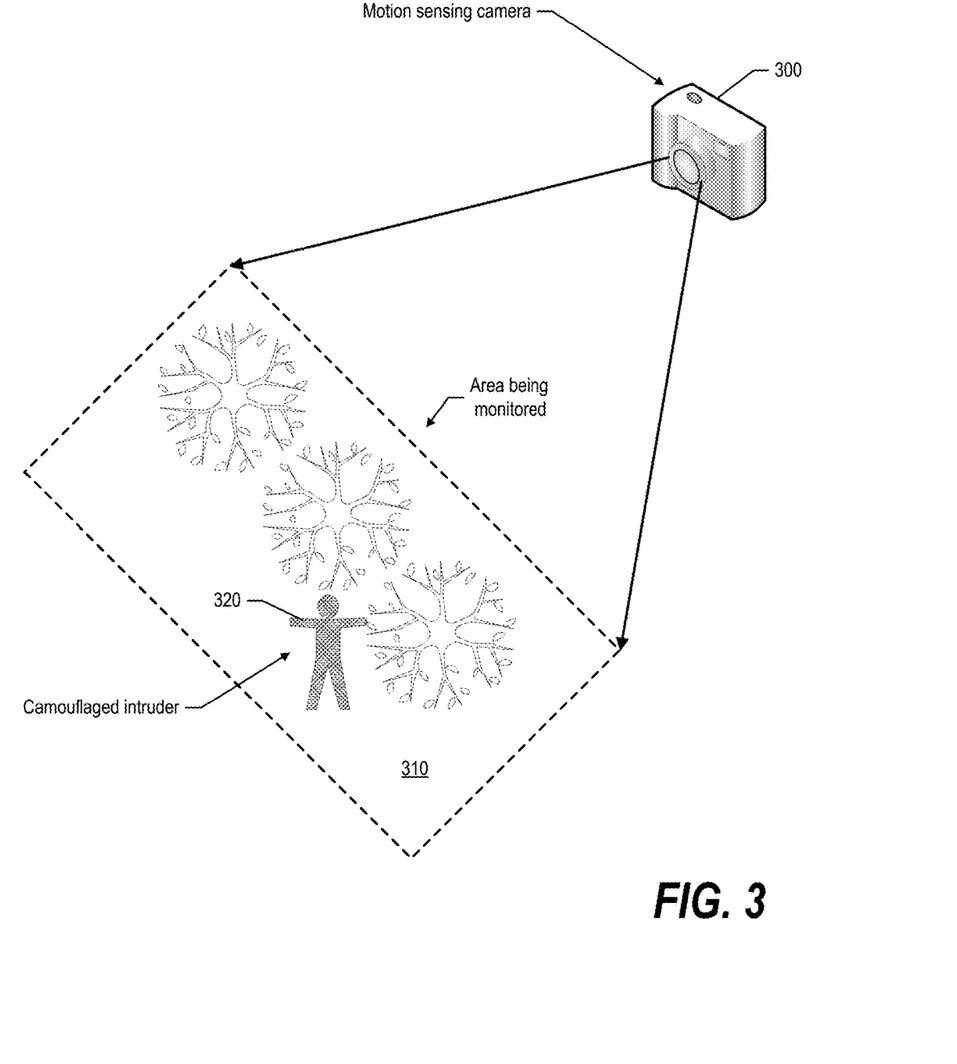
FIG. 3 is a diagram of a motion sensing camera monitoring an area to detect intruders using statistical noise analysis.

FIG. 3 is a diagram of a motion sensing camera monitoring an area to detect intruders using statistical noise analysis. Digital video camera 300 captures video images of area 310 that is being monitored. Reference statistics are calculated that relate to noise characteristics that correspond to pixels in a first set of video images taken by camera 300 of area 310. The first set of video images are taken during an initialization process when the area is clear of external objects, such as people, that are normally not in area 310. The noise characteristics pertain to objects, such as trees, fences, walls, and the like, that make up the area that is being monitored. After initialization, camera 300 takes a second set of images during active monitoring of area 310. Current noise characteristics are received from the second set of images that correspond to the pixels in the second set of video images of area 310 that is being monitored. Motion, such as the presence of intruder 320 who is wearing camouflage to match the background in area 310, is detected by comparing the reference statistics to the current noise characteristics. For example, when current noise characteristics, such as standard deviation, average, mode, any moment of distribution including, but not limited to mean (first raw moment), variance (second central moment), asymmetry (third standardized moment), kurtosis (fourth standardized moment), etc. of brightness, color, and the like, of pixels in a section exceed the standard deviation of the above mentioned noise characteristics established by the reference statistics then motion is detected, such as the presence of camouflaged intruder 320. In one embodiment, the reference statistics include an average and a standard deviation for each of the pixels.

In some embodiments, to avoid detection of overly small objects such as insects in an outdoor setting, a minimum size threshold can be used. In this embodiment, a set of pixels in the video images with current noise characteristics that deviate from the corresponding reference statistics by a statistically significant amount with each of the set of pixels being within a section of the area being monitored. A size of the section is determined and compared with a size threshold with the motion detection being triggered in response to the size of the section exceeding the size threshold. Also, in some embodiments, a time element can be incorporated so that the object is detected for some period of time, such as two seconds, etc., before the motion is triggered. The minimum size threshold and time threshold can be combined so that the object detected has a size over the threshold and appears in the images for the minimum time threshold before the motion detection is triggered (e.g., activating an alarm, etc.).

Figure 4:
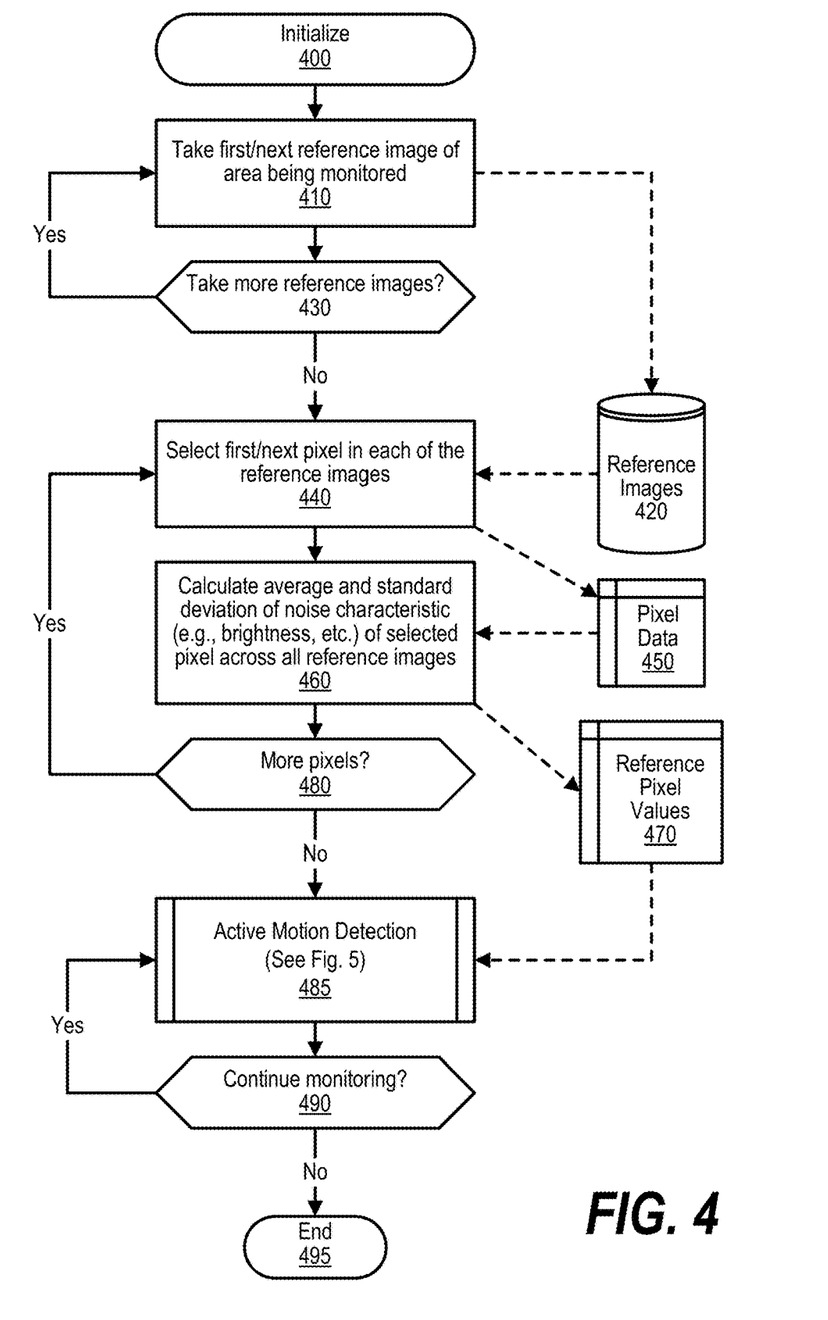
FIG. 4 is a flowchart showing steps taken to initialize the motion sensor system by capturing and analyzing reference images.

FIG. 4 is a flowchart showing steps taken to initialize the motion sensor system by capturing and analyzing reference images. FIG. 4 commences at 400 and shows the steps taken by a process that performs initialization processing. At step 410, the process takes the first reference image of area being monitored and stores the data in reference images data store 420. The process determines as to whether take more reference images (decision 430). If more reference images are needed, decision 430 branches to the "yes" branch which loops back to take the next reference image and stores it in data store 420. This looping continues until enough reference images have been taken, at which point decision 430 branches to the "no" branch for further processing. The amount of reference images desired may depend on the environment being monitored, such as an outdoor environment with changing lighting conditions, which may need more reference images in order to calculate useful reference statistics.

At step 440, the process selects first/next pixel in each of the reference images by retrieving the data from reference images data store 420 and storing the pixel data in memory area 450. At step 460, the process calculates average, standard deviation, mode of distribution, and/or other statistical characteristics of signal and noise (e.g., brightness, etc.) of selected pixel across all reference images by retrieving the pixel data from pixel data memory area 450. Step 460 stores the calculated reference statistics in reference pixel values memory area 470. The process determines as to whether there are more pixels to process (decision 480). If there are more pixels to process, then decision 480 branches to the "yes" branch which loops back to step 440 to select and process the next pixel from each of the reference images. This looping continues until all of the pixels have been processed, at which point decision 480 branches to the "no" branch.

Figure 5:
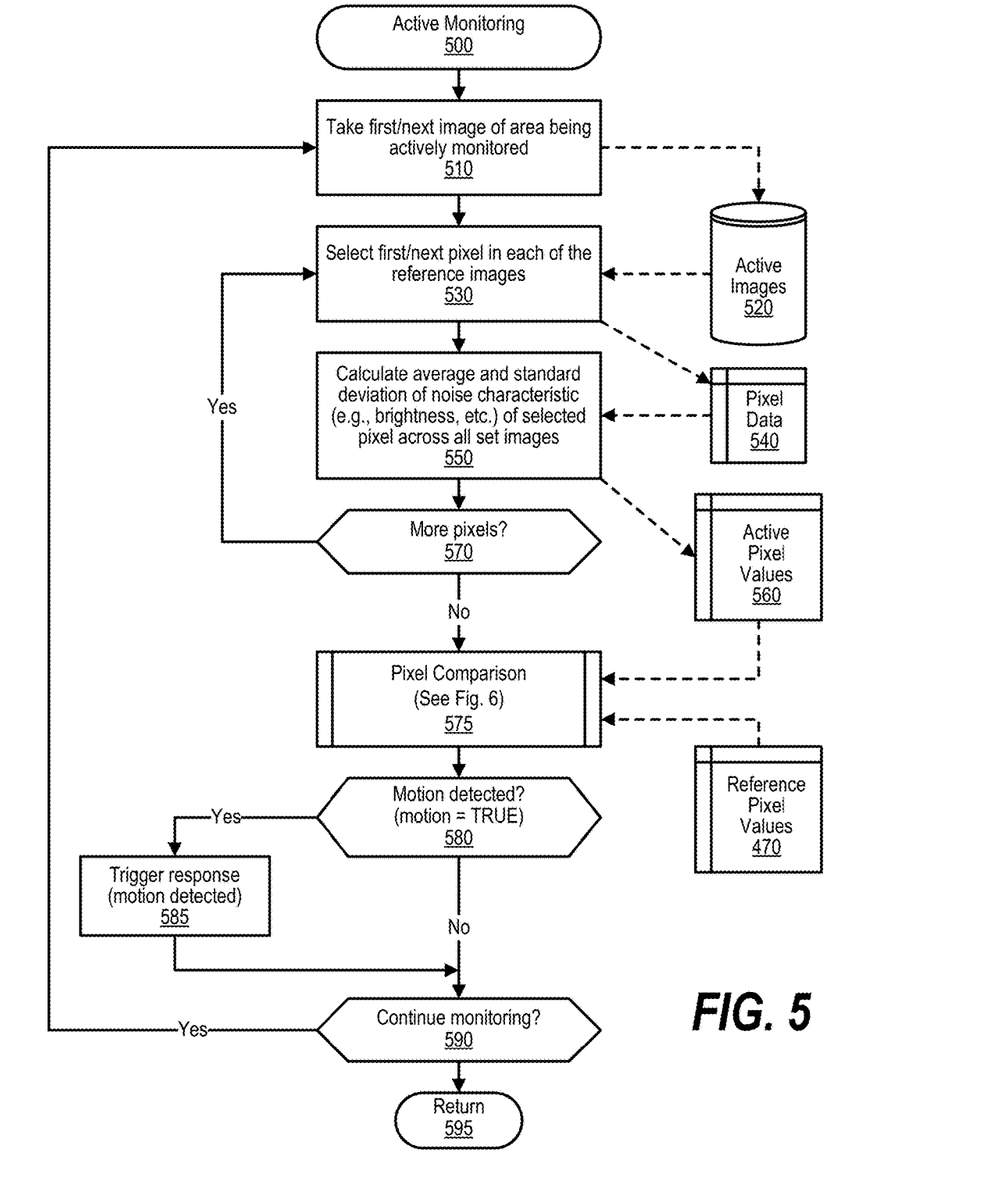
FIG. 5 is a flowchart showing steps taken during active motion detection using statistical noise analysis to detect motion.

At predefined process 485, the process performs the active motion detection routine (see FIG. 5 and corresponding text for processing details). The process determines as to whether continue monitoring (decision 490). If monitoring of the area continues, then decision 485 branches to the "yes" branch which loops back to predefined process to continue monitoring the area. When monitoring is no longer desired, such as the motion detector being turned "off", then decision 490 branches to the "no" branch and processing ends at 495.

FIG. 5 is a flowchart showing steps taken during active motion detection using statistical noise analysis to detect motion. FIG. 5 commences at 500 and shows the steps taken by a process that performs active monitoring of the area that is being monitored. At step 510, the process takes the first active image of area being monitored and stores the data in active images data store 520. At step 530, the process selects first/next pixel in each of the active images by retrieving the data from active images data store 520 and storing the pixel data in memory area 540. In one embodiment, at step 550, the process calculates average, standard deviation, mode of distribution, and/or other statistical characteristics of signal and noise (e.g., brightness, etc.) of selected pixel across all active images by retrieving the pixel data from pixel data memory area 540. Step 550 stores the calculated active pixel values in memory area 560. In one embodiment, the image noise statistics pertaining to active images are compared to the calculated reference statistics (e.g., comparing an average noise value of the pixel from the active images and determining whether it is within the standard deviation established for the pixel during the initialization processing shown in FIG. 3). The process determines as to whether there are more pixels to process (decision 570). If there are more pixels to process, then decision 570 branches to the "yes" branch which loops back to step 530 to select and process the next pixel from each of the set of active images. The set of active images may be limited based on a size threshold so that a reasonable number of active images are analyzed (e.g., images taken over the past ten seconds, etc.). This looping continues until all of the pixels have been processed, at which point decision 570 branches to the "no" branch.

Figure 6:
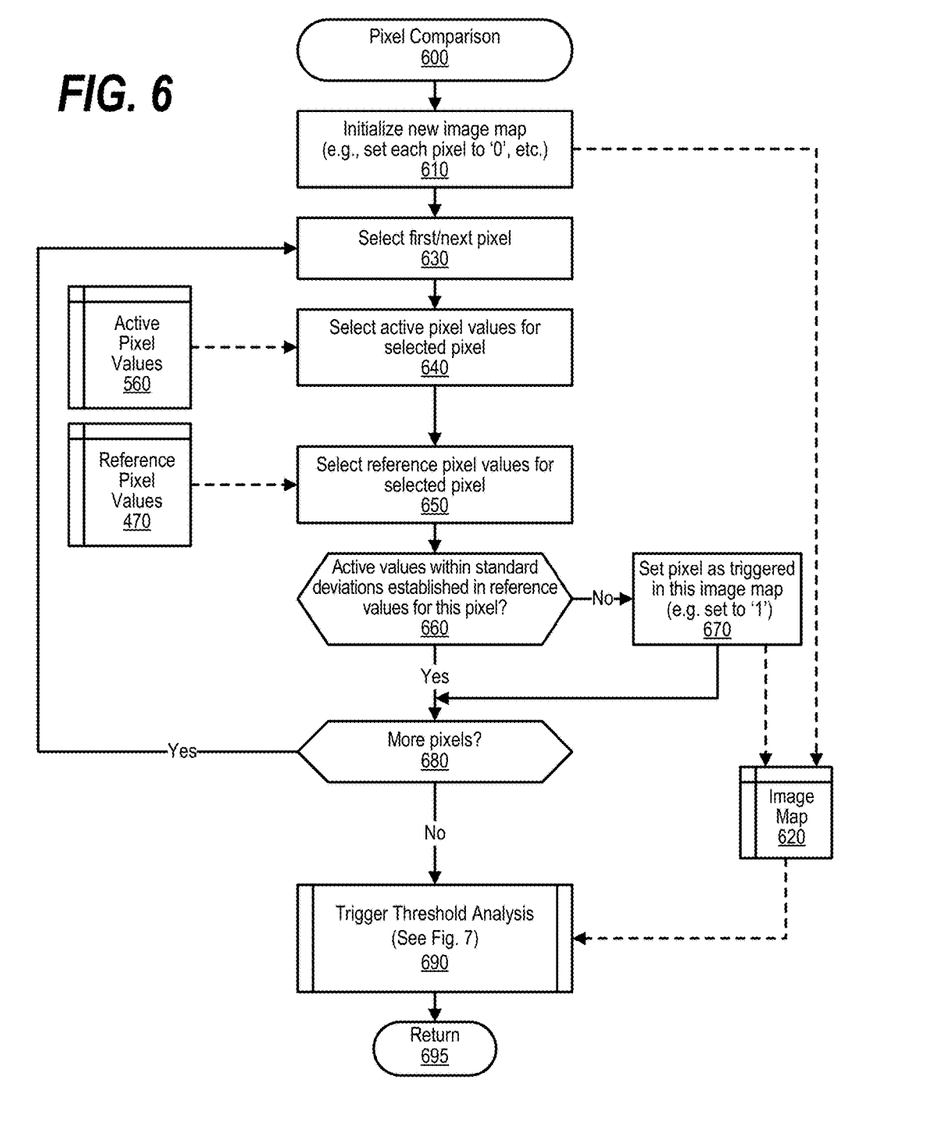
FIG. 6 is a flowchart showing steps taken during pixel comparison performed during active motion detection to detect motion.

At predefined process 575, the process performs the pixel comparison routine (see FIG. 6 and corresponding text for processing details). The pixel comparison routine compares active pixel data from memory area 560 with reference pixel values from memory area 470. The process determines as to whether motion was detected by the pixel comparison routine (decision 580). If motion was detected, then decision 580 branches to the "yes" branch whereupon, at step 585, the process triggers an appropriate response in response to the motion (e.g., trigger an alarm, etc.). On the other hand, if motion was not detected by the pixel comparison routine, then decision 580 branches to the "no" branch bypassing step 585.

The process determines as to whether to continue monitoring the area (decision 590). If monitoring continues, then decision 590 branches to the "yes" branch which loops back to take and process the next active image as described above. This looping continues until monitoring is turned off, at which point decision 590 branches to the "no" branch and processing returns to the calling routine (see FIG. 4) at 595.

FIG. 6 is a flowchart showing steps taken during pixel comparison performed during active motion detection to detect motion. Pixel comparison processing commences at 600 whereupon, at step 610 At step 610, the process initializes a new image map (e.g., by setting each pixel in the map to '0', etc.). At step 630, the process selects the first pixel to be processed. At step 640, the process selects active pixel values for selected pixel from memory area 560. At step 650, the process selects reference pixel values for selected pixel from memory area 470.

The process determines as to whether the active values for the pixel are within the statistical values (e.g., standard deviations, etc.) previously established and stored in reference values for this pixel (decision 660). If the active values that represent the current environment are outside of the statistical values established for this pixel, then decision 660 branches to the "no" branch whereupon, at step 670, the process sets the pixel as being triggered (e.g., set to '1', etc.) in this image map and updates the image map stored in memory area 620 accordingly. On the other hand, if the active values are within the statistical reference values established for this pixel, then decision 660 branches to the "yes" branch bypassing step 670.

The process determines as to whether there are more pixels to process (decision 680). If there are more pixels to process, then decision 680 branches to the "yes" branch which loops back to select and process the next pixel as described above. This looping continues until all of the pixels have been processed and the image map stored in memory area 620 has been fully updated, at which point decision 680 branches to the "no" branch whereupon, at predefined process 690, trigger threshold analysis is performed to determine if triggered sections in the image map exceed a threshold size and if such triggered sections have been detected for an amount of time that meets a time threshold (see FIG. 7 and corresponding text for further processing details). Processing thereafter returns to the calling routine (see FIG. 5) at 695.

Figure 7:
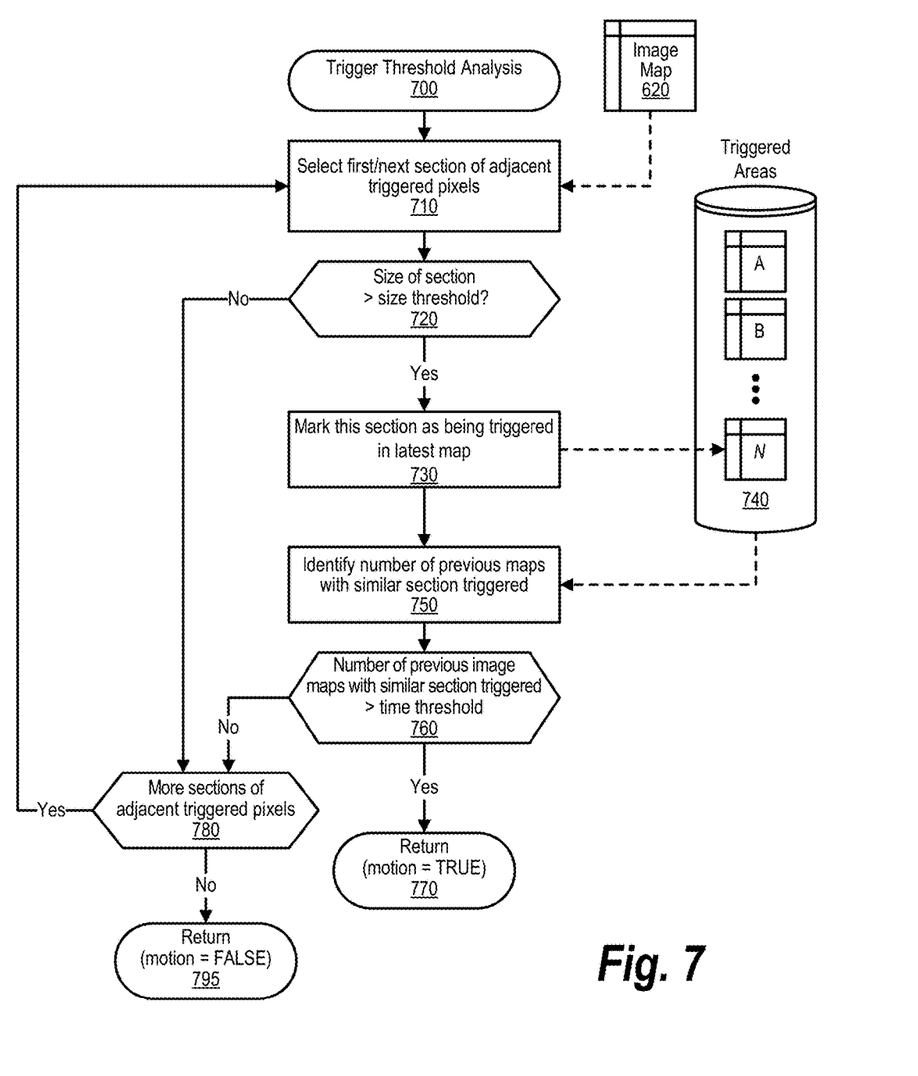
FIG. 7 is a flowchart showing steps taken during trigger threshold analysis to determine if a motion-related threshold has been triggered.

FIG. 7 is a flowchart showing steps taken during trigger threshold analysis to determine if a motion-related threshold has been triggered. Trigger threshold analysis processing commences at 700 whereupon, at step 710, the process selects the first section of adjacent triggered pixels from the image map that is retrieved from memory area 620. The process determines as to whether the size of the selected section exceeds an established size threshold (decision 720). In some environments, a minimum size threshold may be desired to avoid detections of overly small objects, such as insects in outdoor environments. If the size of the selected section is greater than the size threshold, then decision 720 branches to the "yes" branch for further processing.

In one embodiment, a series of image maps representing triggered areas are stored in data store 740. At step 730, the process marks the selected section as having been triggered in the latest image map. At step 750, the process identifies the number of previous image maps with a similar section being triggered. In one embodiment, a similar section is a previous image map with a section that overlaps with the section in the current image map. The number of previous image maps is used to identify an amount of time that the section has been triggered. For example, if the camera is capturing two images per second, then the number of images with a similar section triggered can be divided by two to identify the amount of time that the similar section has been triggered. Because an intruder might be moving, similar sections are identified rather than identifying whether the same section has been triggered.

The process determines as to whether the number of previous images with similar triggered sections (amount of time) exceeds a time threshold (decision 760). In some environments, the detection of the motion may not be desired until the motion has been detected for some amount of time (e.g. two seconds, etc.). Using a camera that is taking two images per second and a threshold of two seconds, the time threshold will not be triggered until at least four similar sections are triggered in subsequent image maps. If the number of previous images with similar sections triggered exceeds the established time threshold, then decision 760 branches to the "yes" branch whereupon processing returns to the calling routine (see FIG. 6) with a return code indicating that motion has been detected that exceeds the established size and time thresholds.

On the other hand, if either the size of the selected section does not exceed the established size threshold (with decision 720 branching to the "no" branch) or if the number of consecutive previous images with a similar triggered section does not exceed the established time threshold (with decision 760 branching to the "no" branch), then The process determines as to whether there are more sections of adjacent triggered pixels in the current image map to process (decision 780). If there are more sections of adjacent triggered pixels to process, then decision 780 branches to the "yes" branch which loops back to select and process the next triggered section. This looping continues until a section exceeds both the size and time thresholds (with decision 760 branching to the "yes" branch and returning at 770 indicating that motion was detected), or until there are no more sections of adjacent triggered pixels to process, at which point decision 780 branches to the "no" branch and processing returns to the calling routine (see FIG. 6) at 795 with a return code indicating that motion was not detected.

Figure 8A:
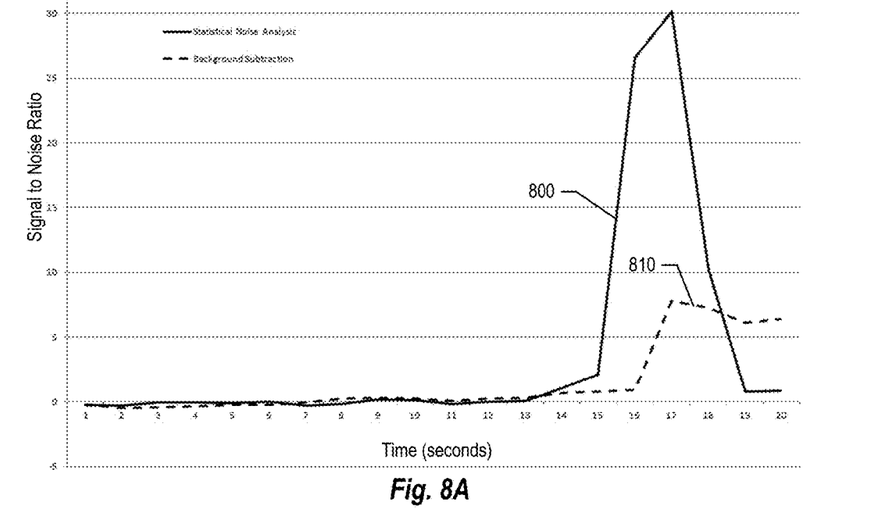
FIG. 8A is a graph comparing motion detection using statistical noise analysis to background subtraction in a first test.

FIG. 8A is a graph comparing motion detection using statistical noise analysis to background subtraction in a first test. In this test, both statistical noise analysis described in FIG. 3-7 was utilized to detect motion as well as a process that used a traditional approach of background subtraction to detect the same motion. As shown, the statistical noise analysis approach (graph line 800) detected the motion a full second before the traditional background subtraction approach (graph line 810). In addition, the same motion exhibited a significantly greater statistical to noise ratio in the statistical noise analysis as compared to the background subtraction approach with the statistical noise analysis reaching a maximum value of 30 and the background subtraction approach reaching a maximum value less than 10.

Figure 8B:
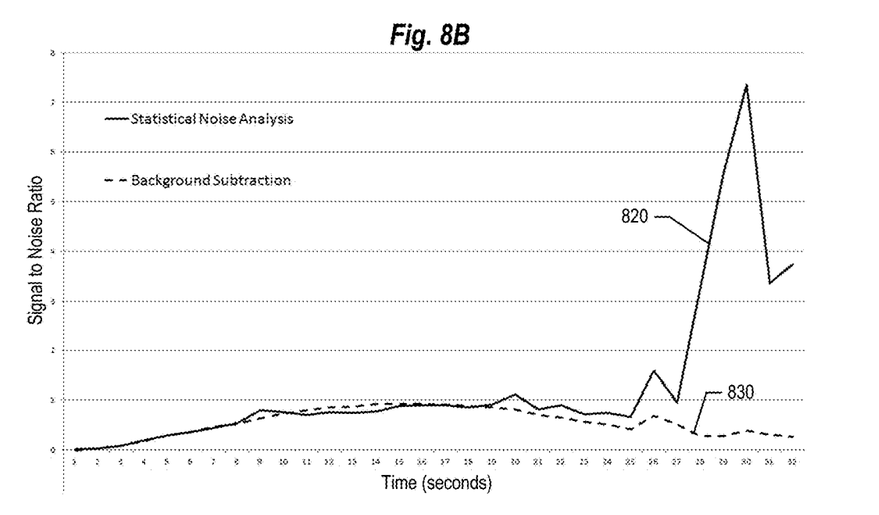
FIG. 8B is a graph comparing motion detection using statistical noise analysis to background subtraction in a second test.

FIG. 8B is a graph comparing motion detection using statistical noise analysis to background subtraction in a second test. In this test, an object was moved in a manner to cause a shadow to appear on a wall which might be similar to a camouflaged intruder blending in with the area being monitored but causing a shadow to appear. Here, graph line 820 shows that the statistical noise analysis approach detected the motion, while graph line 830 shows that the same motion was not even detected by the traditional background subtraction approach.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
    calculating reference statistics related to one or more noise characteristics that correspond to a plurality of pixels in a first set of a plurality of video images of an area being monitored;
    receiving current noise characteristics that correspond to the plurality of pixels in a second set of one or more video images of the area being monitored, wherein the first set of video images were captured before the second set of video images; and
    detecting a motion in the area being monitored by comparing the reference statistics to the current noise characteristics.

2. The method of claim 1 wherein the reference statistics include an average and a standard deviation related to each of the plurality of pixels.

3. The method of claim 1 further comprising:
    identifying a set of pixels in the second set of video images with current noise characteristics that deviate from the corresponding reference statistics by a statistically significant amount, wherein each of the set of pixels is within a section of the area being monitored;
    comparing a size of the section with a size threshold; and
    detecting the motion in response to the size of the section exceeding the size threshold.

4. The method of claim 1 wherein the second set of video images is a plurality of images captured over a period of time, the method further comprising:
    identifying a set of pixels in the second set of video images with current noise characteristics that deviate from the corresponding reference statistics by a statistically significant amount;
    identifying an amount of time that the set of pixels have the current noise characteristics that deviate from the corresponding reference statistics by the statistically significant amount;
    comparing the amount of time to a time threshold; and
    detecting the motion in response to the amount of time exceeding the time threshold.

5. The method of claim 4 wherein the detecting further comprises:
    identifying a section of the area being monitored that encompass the set of pixels;
    comparing a size of the section with a size threshold; and
    detecting the motion in response to the size of the section exceeding the size threshold in addition to the amount of time exceeding the time threshold.

6. The method of claim 1 further comprising:
    calculating current statistics related to the noise characteristics that correspond to the plurality of pixels in a second set of video images, wherein the current noise characteristics are the calculated current statistics; and
    comparing the current statistics to the reference statistics.

7. The method of claim 6 wherein the reference statistics are selected from a group consisting of a mode, a mean, a variance, a skewness, and a Kurtosis.

8. An information handling system comprising:
    one or more processors;
    a memory coupled to at least one of the processors; and
    a set of instructions stored in the memory and executed by at least one of the processors to:
        calculate reference statistics related to one or more noise characteristics that correspond to a plurality of pixels in a first set of a plurality of video images of an area being monitored;
        receive current noise characteristics that correspond to the plurality of pixels in a second set of one or more video images of the area being monitored, wherein the first set of video images were captured before the second set of video images; and
        detect a motion in the area being monitored by comparing the reference statistics to the current noise characteristics.

9. The information handling system of claim 8 wherein the reference statistics include an average and a standard deviation related to each of the plurality of pixels.

10. The information handling system of claim 8 wherein the set of instructions further comprises instructions to:
    identify a set of pixels in the second set of video images with current noise characteristics that deviate from the corresponding reference statistics by a statistically significant amount, wherein each of the set of pixels is within a section of the area being monitored;
    compare a size of the section with a size threshold; and
    detect the motion in response to the size of the section exceeding the size threshold.

11. The information handling system of claim 8 wherein the second set of video images is a plurality of images captured over a period of time, and wherein the set of instructions further comprises instructions to:
    identify a set of pixels in the second set of video images with current noise characteristics that deviate from the corresponding reference statistics by a statistically significant amount;
    identify an amount of time that the set of pixels have the current noise characteristics that deviate from the corresponding reference statistics by the statistically significant amount;
    compare the amount of time to a time threshold; and
    detect the motion in response to the amount of time exceeding the time threshold.

12. The information handling system of claim 11 wherein the set of instructions to detect further comprises instructions to:
    identify a section of the area being monitored that encompass the set of pixels;
    compare a size of the section with a size threshold; and
    detect the motion in response to the size of the section exceeding the size threshold in addition to the amount of time exceeding the time threshold.

13. The information handling system of claim 8 wherein the set of instructions further comprises instructions to:
    calculate current statistics related to the noise characteristics that correspond to the plurality of pixels in a second set of video images, wherein the current noise characteristics are the calculated current statistics; and
    compare the current statistics to the reference statistics.

14. The information handling system of claim 8 wherein the reference statistics are selected from a group consisting of a mode, a mean, a variance, a skewness, and a Kurtosis, and wherein the information handling system further comprises:
    a digital camera that captures the first and second sets of video images.

15. A computer program product comprising:
    a set of computer instructions stored on a computer readable storage medium comprising, the computer instructions effective to:
        calculate reference statistics related to one or more noise characteristics that correspond to a plurality of pixels in a first set of a plurality of video images of an area being monitored;

receive current noise characteristics that correspond to the plurality of pixels in a second set of one or more video images of the area being monitored, wherein the first set of video images were captured before the second set of video images; and detect a motion in the area being monitored by comparing the reference statistics to the current noise characteristics.

16. The computer program product of claim 15 wherein the reference statistics include an average and a standard deviation related to each of the plurality of pixels.

17. The computer program product of claim 15 wherein the set of instructions further comprise instructions effective to:

identify a set of pixels in the second set of video images with current noise characteristics that deviate from the corresponding reference statistics by a statistically significant amount, wherein each of the set of pixels is within a section of the area being monitored;

compare a size of the section with a size threshold; and detect the motion in response to the size of the section exceeding the size threshold.

18. The computer program product of claim 15 wherein the second set of video images is a plurality of images captured over a period of time, and wherein the set of instructions further comprise instructions effective to:

identify a set of pixels in the second set of video images with current noise characteristics that deviate from the corresponding reference statistics by a statistically significant amount;

identify an amount of time that the set of pixels have the current noise characteristics that deviate from the corresponding reference statistics by the statistically significant amount;

compare the amount of time to a time threshold; and detect the motion in response to the amount of time exceeding the time threshold.

19. The computer program product of claim 18 wherein the set of instructions to detect further comprise instructions effective to:

identify a section of the area being monitored that encompass the set of pixels;

compare a size of the section with a size threshold; and detect the motion in response to the size of the section exceeding the size threshold in addition to the amount of time exceeding the time threshold.

20. The computer program product of claim 15 wherein the set of instructions further comprise instructions effective to:

calculate current statistics related to the noise characteristics that correspond to the plurality of pixels in a second set of video images, wherein the current noise characteristics are the calculated current statistics; and compare the current statistics to the reference statistics.

* * * * *